E. L. REED.
TRIPOD SUPPORT.
APPLICATION FILED JULY 16, 1919.
1,371,263.
Patented Mar. 15, 1921.
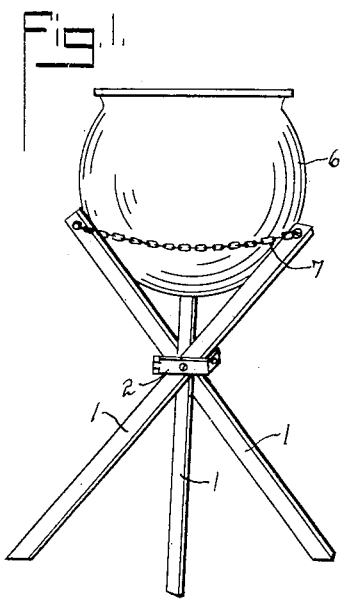
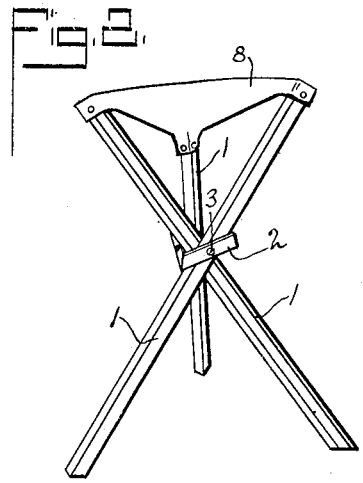
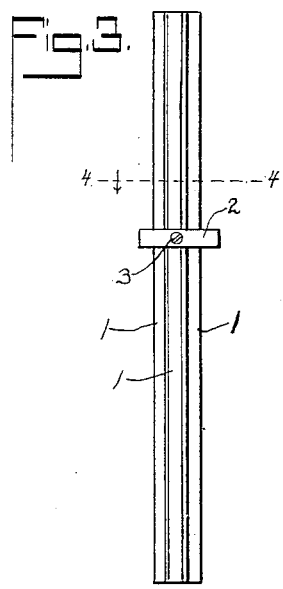
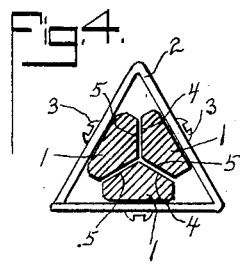
Inventor
Evan L. Reed.
By Walter N. Haskell.
his Attorney

UNITED STATES PATENT OFFICE.

EVAN L. REED, OF STERLING, ILLINOIS.

TRIPOD SUPPORT.

1,371,263.  Specification of Letters Patent.  Patented Mar. 15, 1921.

Application filed July 16, 1919. Serial No. 311,304.

*To all whom it may concern:*

Be it known that I, EVAN L. REED, a citizen of the United States, residing at Sterling, in the county of Whiteside and State of Illinois, have invented certain new and useful Improvements in Tripod Supports, of which the following is a specification.

My invention has reference to tripod supports, and comprises a simple frame for use in supporting baskets, boxes, and similar articles, which can be folded into a compact space when not in use. It is of special use for holding baskets and other receptacles containing commodities which are on display in front of a store or on the inside thereof, but the uses to which it can be put are numerous.

In the drawings:

Figure 1 is a perspective view of my invention, illustrating one of the uses thereof. Fig. 2 shows the same in a different use. Fig. 3 shows the device folded, and Fig. 4 is a cross-section on the line 4—4 of Fig. 3.

The device comprises three supporting members or legs 1, encircled by a triangular band 2, each of said legs being pivotally connected with one of the bars of said band by means of a screw 3. Each of the members 1 has an inner diagonal face 4, and an oppositely disposed similar face 5, one of each of the faces 4 being in proximity to one of the faces 5. When in a folded position, as shown in Figs. 3 and 4, the legs 1 form a compact bundle. When it is desired to use the same each of the members 1 is turned upon its pivot until the movement thereof is arrested by the bar of the triangle just in front thereof, said members assuming the position shown in Figs. 1 and 2. In this operation the parts 1 are all moved in the same direction with relation to each other, and the faces 4 and 5 have a sliding contact throughout the movement, such contact being maintained when the device is in open position. This adds to the rigidity of the tripod, and assists in resisting any strain that may be put upon it.

In Fig. 1 the invention is shown when in use for supporting a glass globe 6, such as are in use for domestic aquariums. In this use the upper ends of the members 1 are preferably reinforced by means of a chain 7, passing through openings in the upper ends of said members. A more common use therefor is to support a basket containing vegetables or other commodities in front of a store, the receptacle being thus held at a desired height above the ground. It can also be employed to support jardinières containing plants, and in many other ways.

In Fig. 2 my invention is shown with its upper ends provided with a piece of canvas or other fabric 8, whereby the same may be used as a seat. When made in a larger size it can be used as a camp-stool, and in smaller sizes can be used in automobiles and other vehicles for an extra seat. When not in use it can be folded and stowed away in a small space.

The device can be cheaply manufactured, as the parts thereof are few and not complicated, and the leg members can be formed from material which would ordinarily be sent to the scrap pile.

In opening the device the legs 1 can be turned in either direction.

What I claim and desire to secure, is:

1. A device of the class described, comprising a triangular band, and leg members pivotally connected with the bars of said band, on the inside thereof.

2. A device of the class described, comprising a triangular band, and leg members connected with the bars of said band so as to permit the turning thereof in either direction to form a tripod.

3. A device of the class described, comprising a triangular band, and leg members pivotally connected with the bars of said band on the inner side thereof, said leg members being provided on the inside with co-acting beveled faces.

In testimony whereof I affix my signature.

EVAN L. REED.